United States Patent
Kling et al.

(10) Patent No.: US 10,607,022 B2
(45) Date of Patent: Mar. 31, 2020

(54) VERTICALLY INTEGRATED ACCESS CONTROL SYSTEM FOR IDENTIFYING AND REMEDIATING FLAGGED COMBINATIONS OF CAPABILITIES RESULTING FROM USER ENTITLEMENTS TO COMPUTING RESOURCES

(71) Applicant: Bank of America Corporation, Charlotte, NC (US)

(72) Inventors: John Howard Kling, Cincinnati, OH (US); Brandon Sloane, Santa Barbara, CA (US); Regina Yee Cadavid, San Gabriel, CA (US); Rachel Yun Kim Bierner, Los Angeles, CA (US); Ronald James Kuhlmeier, Simi Valley, CA (US)

(73) Assignee: Bank of America Corporation, Charlotte, NC (US)

( * ) Notice: Subject to any disclaimer, the term of this patent is extended or adjusted under 35 U.S.C. 154(b) by 164 days.

(21) Appl. No.: 15/895,720

(22) Filed: Feb. 13, 2018

(65) Prior Publication Data
US 2019/0251276 A1    Aug. 15, 2019

(51) Int. Cl.
*G06F 21/62* (2013.01)
*G06F 17/30* (2006.01)
(Continued)

(52) U.S. Cl.
CPC ........ *G06F 21/6218* (2013.01); *G06F 16/288* (2019.01); *G06F 16/335* (2019.01);
(Continued)

(58) Field of Classification Search
CPC ... H04L 63/102; H04L 63/101; H04L 63/104; G06F 21/604; G06F 3/0622
(Continued)

(56) References Cited

U.S. PATENT DOCUMENTS

| 7,308,704 B2 | 12/2007 | Vogel et al. |
| 7,451,477 B2 | 11/2008 | Griffin et al. |

(Continued)

OTHER PUBLICATIONS

Gery Menegaz, "Enterprise Entitlements Management: Moving Beyond Authentication", Between the Lines, Jun. 7, 2012, retrieved from http://www.zdnet.com/article/enterprise-entitlements-management-moving-beyond-authentication/, 11 pages.

*Primary Examiner* — Haresh N Patel
(74) *Attorney, Agent, or Firm* — Michael A. Springs; Moore & Van Allen PLLC; Peter B. Stewart

(57) ABSTRACT

A vertically integrated access control system may store in a database data records corresponding to the interfaces, access control rules, and computing resources of an information system, as well as data records for entity capabilities. Data records for related interfaces, access control rules, computing resources, and entity capabilities may be linked. Using the database, the system may determine the entity capabilities that can be performed based on an existing user entitlement. If the entity capabilities include a flagged combination of entity capabilities, the system may perform an information security action to remediate the flagged combination. The system may use the database to form vertically integrated access units. The vertically integrated access units may be used to form user entitlements. The system may continuously monitor whether any proposed configurations would create a flagged combination of entity capabilities, and if so take an action to prevent such flagged combination.

20 Claims, 7 Drawing Sheets

(51) Int. Cl.
*H04L 29/06* (2006.01)
*G06F 21/60* (2013.01)
*G06F 16/28* (2019.01)
*G06F 16/335* (2019.01)

(52) U.S. Cl.
CPC .......... *G06F 21/604* (2013.01); *H04L 63/102* (2013.01); *G06F 2221/2141* (2013.01)

(58) Field of Classification Search
USPC .......................................................... 726/4
See application file for complete search history.

(56) References Cited

U.S. PATENT DOCUMENTS

| | | | |
|---|---|---|---|
| 8,132,231 B2 | 3/2012 | Amies et al. | |
| 8,196,184 B2 | 6/2012 | Amirov et al. | |
| 8,225,416 B2 | 7/2012 | Richards et al. | |
| 8,341,242 B2 | 12/2012 | Dillon et al. | |
| 8,490,152 B2 | 7/2013 | Staiman et al. | |
| 8,763,069 B2 | 6/2014 | Renfro et al. | |
| 9,189,644 B2 | 11/2015 | Kling et al. | |
| 9,286,595 B2 | 3/2016 | Taneja et al. | |
| 9,330,280 B2 | 5/2016 | Rachalwar et al. | |
| 9,483,488 B2 | 11/2016 | Kling et al. | |
| 9,491,116 B2 | 11/2016 | Pugh | |
| 9,495,380 B2 | 11/2016 | Kling et al. | |
| 9,558,334 B2 | 1/2017 | Kling et al. | |
| 9,584,525 B2 | 2/2017 | Baikalov et al. | |
| 9,602,517 B2 | 3/2017 | Connor et al. | |
| 9,684,793 B2 | 6/2017 | Schlesinger et al. | |
| 9,785,760 B2 | 10/2017 | Biswas et al. | |
| 10,031,872 B1* | 7/2018 | Friedman | G06F 3/0613 |
| 2004/0249711 A1* | 12/2004 | Walker | G06Q 10/06375 705/14.24 |
| 2009/0043596 A1 | 2/2009 | Pierce | |
| 2010/0197266 A1* | 8/2010 | Raleigh | G06Q 50/06 455/406 |
| 2010/0198698 A1* | 8/2010 | Raleigh | G06Q 30/0601 705/26.1 |
| 2012/0096513 A1* | 4/2012 | Raleigh | H04L 12/1403 726/1 |
| 2013/0065551 A1* | 3/2013 | Raleigh | H04W 12/06 455/405 |
| 2013/0103640 A1 | 4/2013 | Rehman | |
| 2013/0247045 A1* | 9/2013 | Fitzgerald | G06F 9/455 718/1 |
| 2013/0339407 A1* | 12/2013 | Sharpe | G06F 3/0611 707/827 |
| 2014/0006354 A1* | 1/2014 | Parkison | G06F 3/0611 707/649 |
| 2014/0006357 A1* | 1/2014 | Davis | G06F 11/1464 707/667 |
| 2014/0006465 A1* | 1/2014 | Davis | G06F 16/182 707/827 |
| 2014/0007239 A1* | 1/2014 | Sharpe | G06F 21/561 726/24 |
| 2014/0052749 A1* | 2/2014 | Rissanen | G06F 16/24534 707/759 |
| 2014/0067680 A1* | 3/2014 | Turner | G06Q 20/40 705/44 |
| 2014/0173733 A1* | 6/2014 | Ford | H04W 12/12 726/23 |
| 2014/0331252 A1 | 11/2014 | Jin et al. | |
| 2015/0181415 A1* | 6/2015 | Raleigh | H04W 8/22 455/418 |
| 2015/0220659 A1* | 8/2015 | Rissanen | G06F 16/9032 707/759 |
| 2016/0028770 A1* | 1/2016 | Raleigh | H04L 63/20 726/1 |
| 2016/0373440 A1* | 12/2016 | Mather | H04L 63/0861 |
| 2017/0070381 A1* | 3/2017 | Chellappan | H04L 69/324 |
| 2017/0250869 A1* | 8/2017 | Voellmy | H04L 41/0893 |
| 2017/0316215 A1* | 11/2017 | Hadzic | G06F 21/31 |
| 2018/0167413 A1* | 6/2018 | Raleigh | H04W 8/18 |
| 2018/0330113 A1* | 11/2018 | McGrath | G06F 16/2282 |
| 2018/0341778 A1* | 11/2018 | Florentino | H04L 63/102 |
| 2019/0251276 A1* | 8/2019 | Kling | G06F 16/288 |
| 2019/0253427 A1* | 8/2019 | Kling | H04L 63/101 |

* cited by examiner

VERTICALLY INTEGRATED ACCESS CONTROL SYSTEM FOR IDENTIFYING AND REMEDIATING FLAGGED COMBINATIONS OF CAPABILITIES RESULTING FROM USER ENTITLEMENTS TO COMPUTING RESOURCES

FIELD OF THE INVENTION

The present invention relates to a vertically integrated access control system that may be used to identify and remediate flagged combinations of entity capabilities resulting from user entitlements to computing resources. The vertically integrated access control system may store in a database data records corresponding to the interfaces, access control rules, and computing resources of an information system, as well as data records for entity capabilities. Data records for related interfaces, access control rules, computing resources, and entity capabilities may be linked. Using the database, the system may determine the entity capabilities that can be performed based on an existing user entitlement. If the entity capabilities include a flagged combination of entity capabilities, the system may perform an information security action to remediate the flagged combination. The system may use the database to form vertically integrated access units. The vertically integrated access units may be used to form user entitlements. The system may continuously monitor whether any proposed configurations would create a flagged combination of entity capabilities, and if so take an action to prevent such flagged combination.

BACKGROUND

As the use, size, and importance of electronic information systems has increased, it has become more difficult to manage the entitlements provided to users of such systems. Accordingly, a need exists for an improved way of managing user entitlements.

SUMMARY

In one aspect, the present invention embraces a computerized vertically integrated access control system, and an associated method and computer program product, for identifying and remediating flagged combinations of capabilities resulting from user entitlements to computing resources. The system typically includes a processor and a memory. The system also typically includes an access control module stored in the memory and executable by the processor. In one embodiment, the access control module is configured for: collecting information regarding a plurality of entity capabilities of an entity; storing, in a database, a plurality of entity capability data records, each entity capability data record corresponding to an entity capability of the plurality of entity capabilities; collecting information regarding a plurality of flagged combinations of entity capabilities; storing, in the database, a plurality of flagged combination data records, each flagged combination data record corresponding to a flagged combination of entity capabilities; collecting information regarding interfaces of an information system of the entity; collecting information regarding access control rules of the information system; collecting information regarding computing resources of the information system; storing, in the database, a plurality of data records corresponding to the interfaces, access control rules, and computing resources of the information system; for each entity capability, linking in the database such entity capability to each interface that implements such entity capability; for each interface, linking in the database such interface to each access control rule for accessing such interface; for each computing resource, linking in the database such computing resource to each access control rule for accessing such computing resource; for each interface, linking in the database such interface to each computing resource accessed by such interface; identifying entitlements of a first user within the information system; based on the entitlements of the first user, identifying access control rules assigned to the first user; identifying entity capabilities of the first user by identifying entity capabilities linked in the database to the access control rules assigned to the first user; comparing the entity capabilities of the first user to the plurality of flagged combinations of entity capabilities; in response to comparing the entity capabilities of the first user to the plurality of flagged combinations of entity capabilities, determining that the entity capabilities of the first user comprise a first flagged combination of entity capabilities; in response to determining that the entity capabilities of the first user comprise the first flagged combination of entity capabilities, performing an information security action to remediate the first flagged combination of entity capabilities.

In a particular embodiment, the access control module is configured for: collecting information regarding users of the information system, the users of the information system comprising the first user; collecting information regarding entitlements of the information system, the entitlements of the information system comprising the entitlements of the first user; storing, in the database, a plurality of data records corresponding to the users and entitlements of the information system; for each entitlement, linking in the database such entitlement to each user to which such entitlement has been provisioned; and for each entitlement, linking in the database such entitlement to each access control rule associated with such entitlement. The access control module may be further configured for: collecting information regarding permissions of the information system, each permission comprising a subset of the access control rules of the information system; collecting information regarding user groups of the information system; storing, in the database, a plurality of data records corresponding to the permissions and user groups of the information system; for each user group, linking in the database such user group to each user assigned to such user group; for each user group, linking in the database such user group to each permission assigned to such user group; and for each permission, linking in the database such permission to access control rule comprised in such permission.

In another particular embodiment, the step of identifying the access control rules assigned to the first user comprises identifying one or more permissions assigned to the first user.

In another particular embodiment, the computing resources of the information system comprise application component methods; the step of storing, in the database, the plurality of data records corresponding to the interfaces, access control rules, and computing resources of the information system, comprises storing, in the database, a plurality of data records corresponding to the application component methods of the information system; the step of, for each computing resource, linking in the database such computing resource to each access control rule for accessing such computing resource, comprises, for each application component method, linking in the database such application component method to each access control rule for accessing such application component method; and the step of, for each interface, linking in the database such interface to each computing resource accessed by such interface, comprises, for each interface, linking in the database such interface to each application component method accessed by such interface.

In another particular embodiment, the information security action comprises removing from the first user one or more of the entitlements of the first user.

In another particular embodiment, the information security action comprises suspending one or more of the entitlements of the first user.

In another particular embodiment, the information security action comprises modifying one or more of the entitlements of the first user so that the entity capabilities of the first user no longer comprise the first flagged combination of entity capabilities.

In another aspect, the present invention embraces a computerized vertically integrated access control system, and an associated method and computer program product, for creating user entitlements to computing resources. The system typically includes a processor and a memory. The system also typically includes an access control module stored in the memory and executable by the processor. In one embodiment, the access control module is configured for: collecting information regarding a plurality of entity capabilities of an entity; storing, in a database, a plurality of entity capability data records, each entity capability data record corresponding to an entity capability of the plurality of entity capabilities; collecting information regarding a plurality of flagged combinations of entity capabilities; storing, in the database, a plurality of flagged combination data records, each flagged combination data record corresponding to a flagged combination of entity capabilities; collecting information regarding interfaces of an information system of the entity; collecting information regarding access control rules of the information system; collecting information regarding computing resources of the information system; storing, in the database, a plurality of data records corresponding to the interfaces, access control rules, and computing resources of the information system; for each entity capability, linking in the database such entity capability to each interface that implements such entity capability; for each interface, linking in the database such interface to each access control rule for accessing such interface; for each computing resource, linking in the database such computing resource to each access control rule for accessing such computing resource; for each interface, linking in the database such interface to each computing resource accessed by such interface; creating a vertically integrated access unit by: identifying a logical work role, the logical work role comprising one or more first entity capabilities of the plurality of entity capabilities; identifying, from the database, one or more first interfaces that implement the one or more first entity capabilities; identifying, from the database, one or more first interface access control rules for accessing the one or more first interfaces; identifying, from the database, one or more first computing resources accessed by the one or more first interfaces; identifying, from the database, one or more first computing resource access control rules for accessing the one or more first computing resources; and storing, in the database, a data record for the vertically integrated access unit that links in the database data records for the (i) one or more first entity capabilities, (ii) one or more first interfaces, (iii) or more first interface access control rules, (iv) one or more first computing resources, and (v) one or more first computing resource access control rules; creating a user group by: assigning the logical work role to the user group; and based on the logical work role, storing, in the database, a data record for the user group that is linked to the data record for the vertically integrated access unit; provisioning an entitlement by: assigning the logical work role to a first user; and based on assigning the logical work role to the first user, linking the first user to the user group; determining that a proposed configuration of the vertically integrated access unit, a proposed configuration of the user group, a proposed configuration of the first user, or a proposed entitlement would result in a first flagged combination of entity capabilities; and in response to determining that the proposed configuration of the vertically integrated access unit, the proposed configuration of the user group, the proposed configuration of the first user, or the proposed entitlement would result in the first flagged combination of entity capabilities, performing an action to prevent the first flagged combination of entity capabilities.

In a particular embodiment, the step of creating the vertically integrated access unit comprises storing, in the database, a data record corresponding to the logical work role. The step of creating the user group may comprise linking in the database the data record for the user group to the data record corresponding to the logical work role. The access control module is configured to perform the steps of: collecting information regarding users of the information system, the users of the information system comprising the first user; and storing, in the database, a plurality of data records corresponding to the users of the information system, the plurality of data records corresponding to the users of the information system comprising a data record corresponding to the first user; wherein the step of provisioning the entitlement comprises: (i) linking in the database the data record corresponding to the first user to the data record corresponding to the logical work role and (ii) linking in the database the data record corresponding to the first user to the data record for the user group.

In another particular embodiment, the step of determining that the proposed configuration of the vertically integrated access unit, the proposed configuration of the user group, the proposed configuration of the first user, or the proposed entitlement would result in the first flagged combination of entity capabilities is performed during the steps of (i) creating the vertically integrated access unit, (ii) creating the user group, and/or (iii) provisioning the entitlement.

In another particular embodiment, the computing resources of the information system comprise application component methods of the information system; and the one or more first computing resources accessed by the one or more first interfaces comprises one or more first application component methods accessed by the one or more first interfaces.

In another particular embodiment, the action to prevent the first flagged combination of entity capabilities comprises blocking implementation of the proposed configuration of the vertically integrated access unit, the proposed configuration of the user group, the proposed configuration of the first user, or the proposed entitlement.

In another particular embodiment, the action to prevent the first flagged combination of entity capabilities comprises (i) identifying a proposed change that would eliminate the first flagged combination of entity capabilities and (ii) implementing the proposed configuration and the proposed change.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
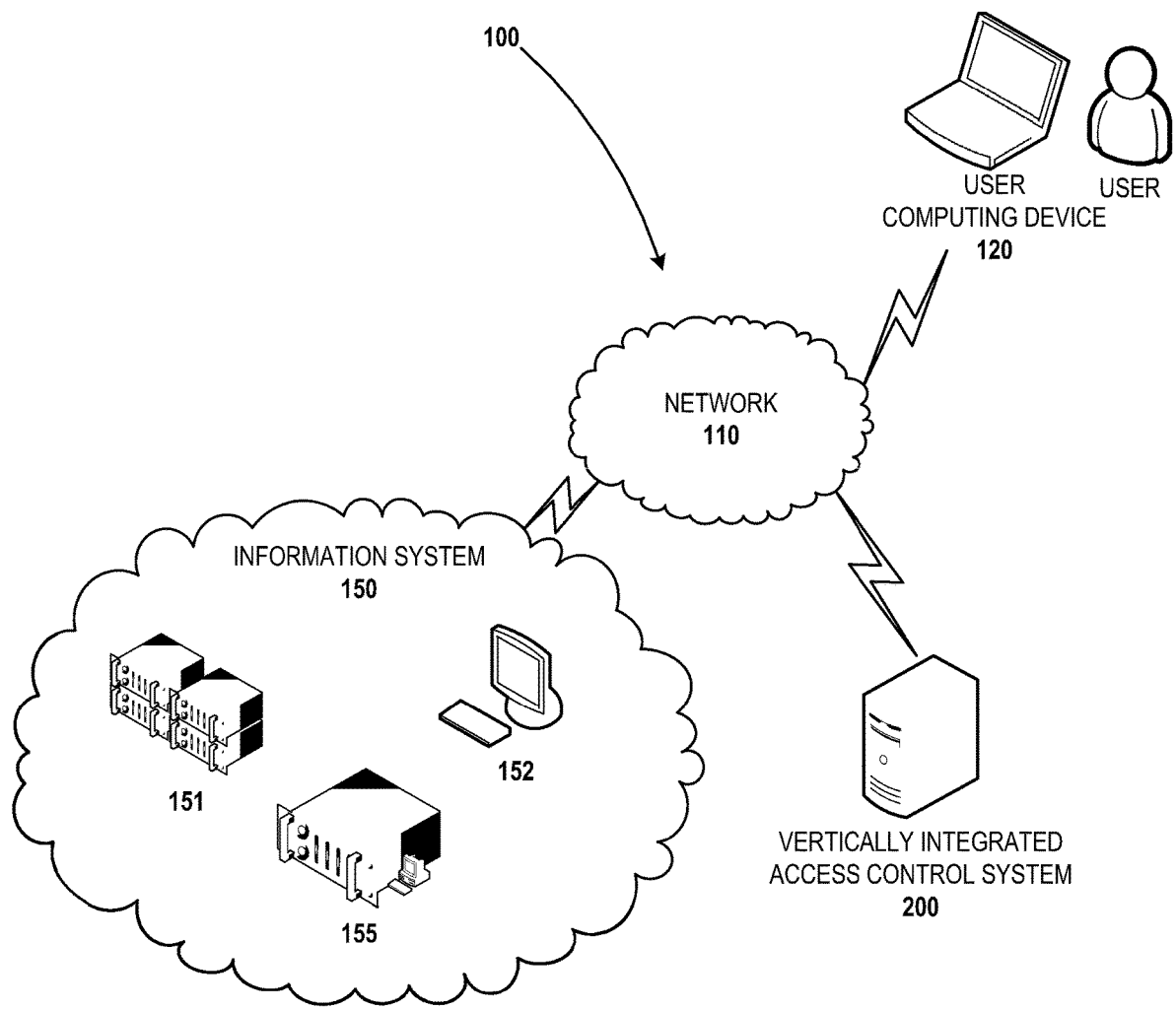
Figure 2:
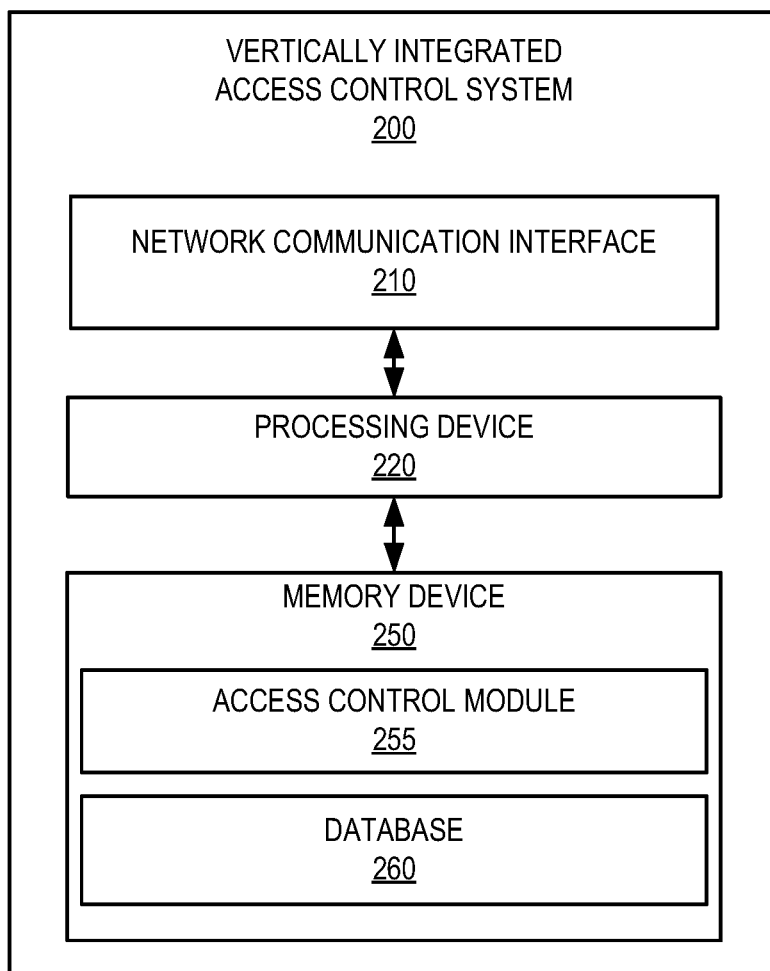
Figure 3A:
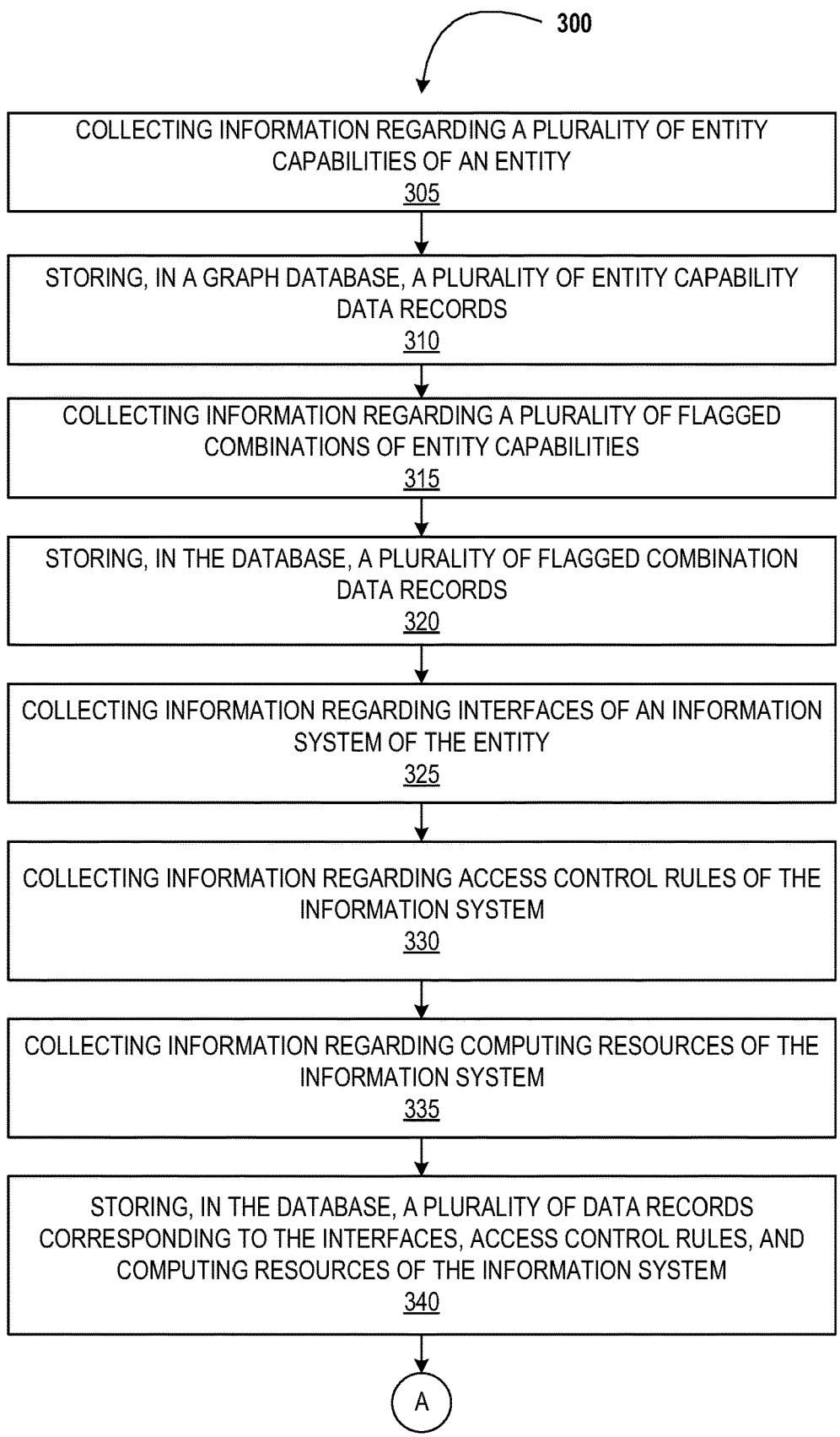
Figure 3B:
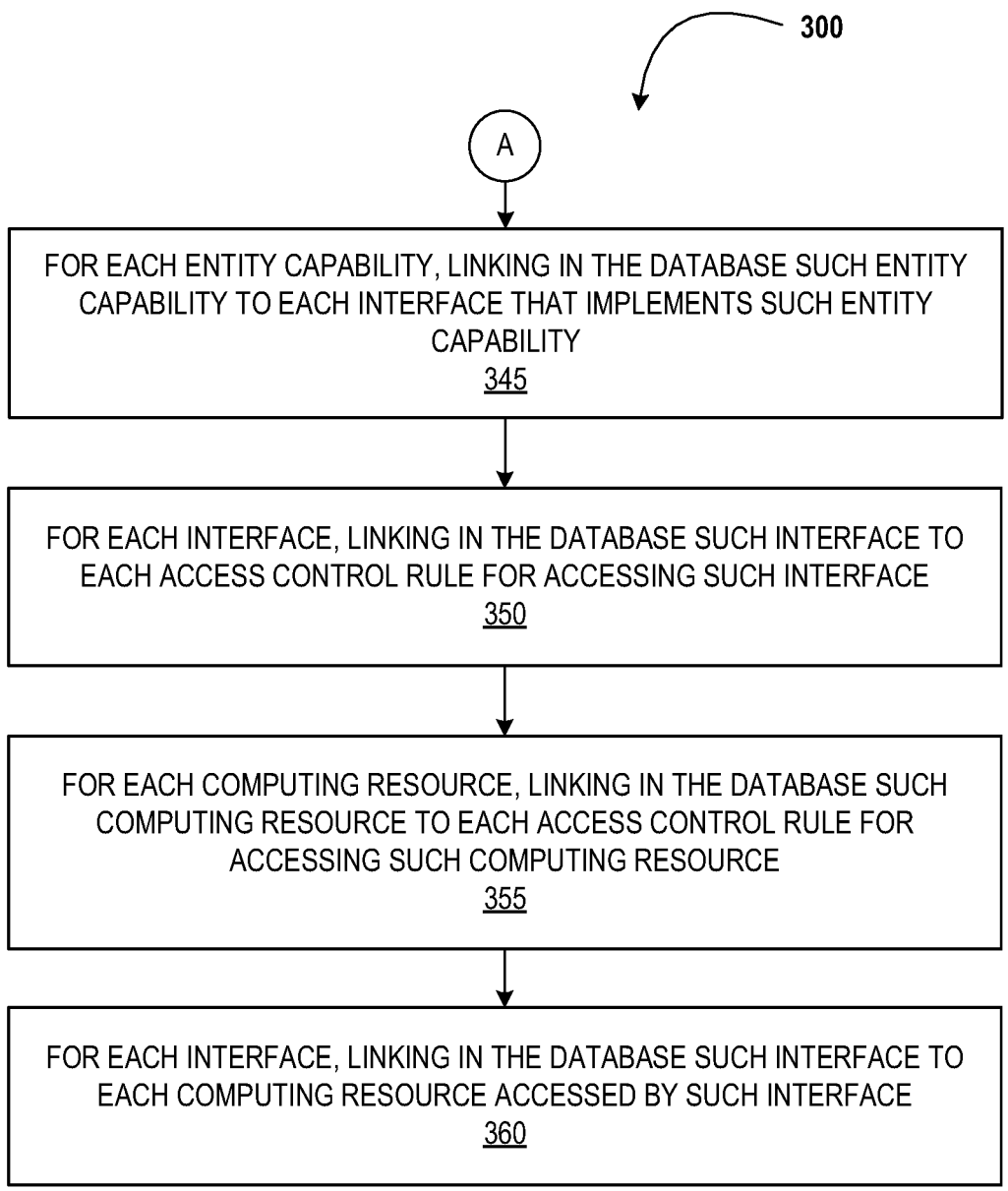
Figure 4:
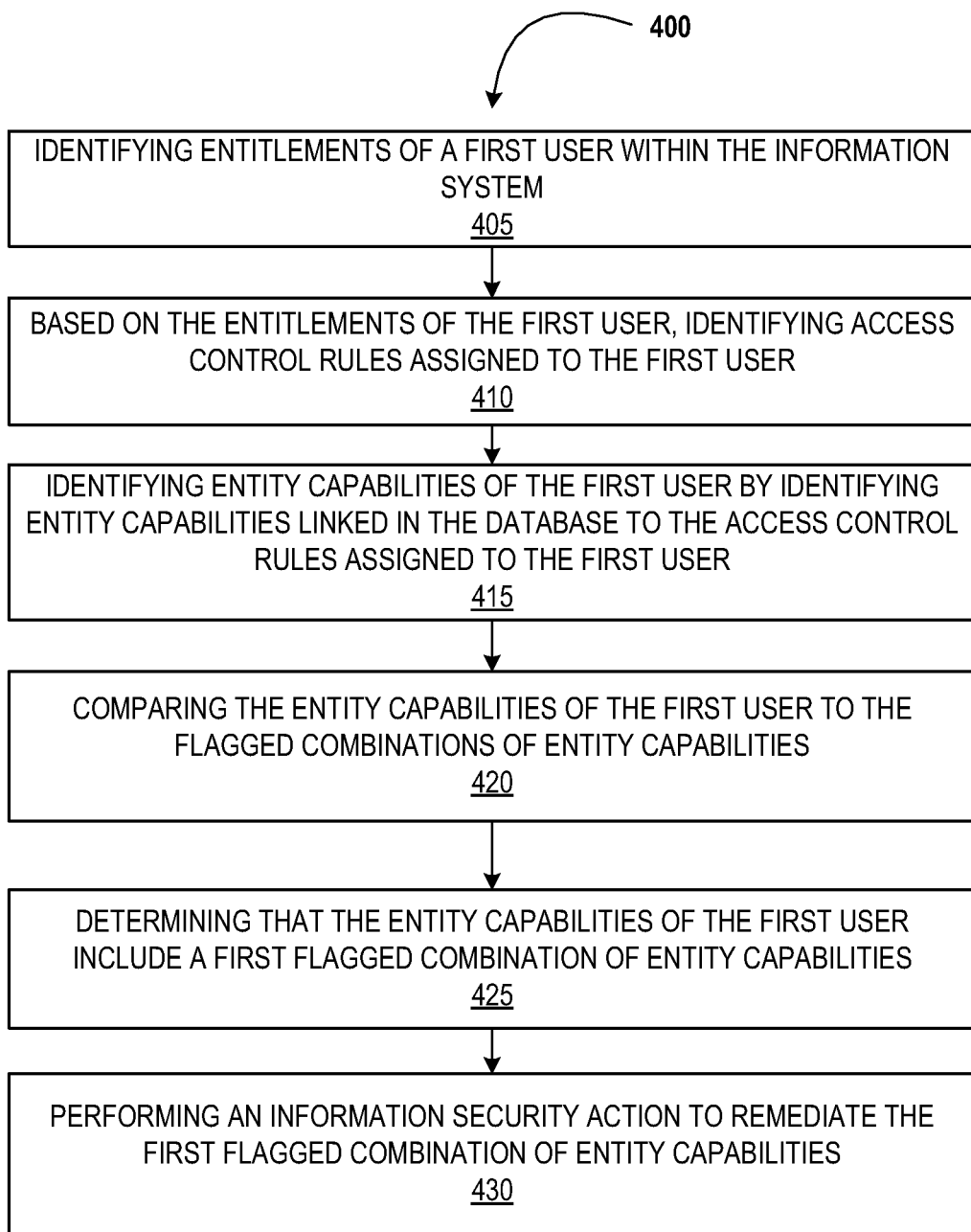
Figure 5:
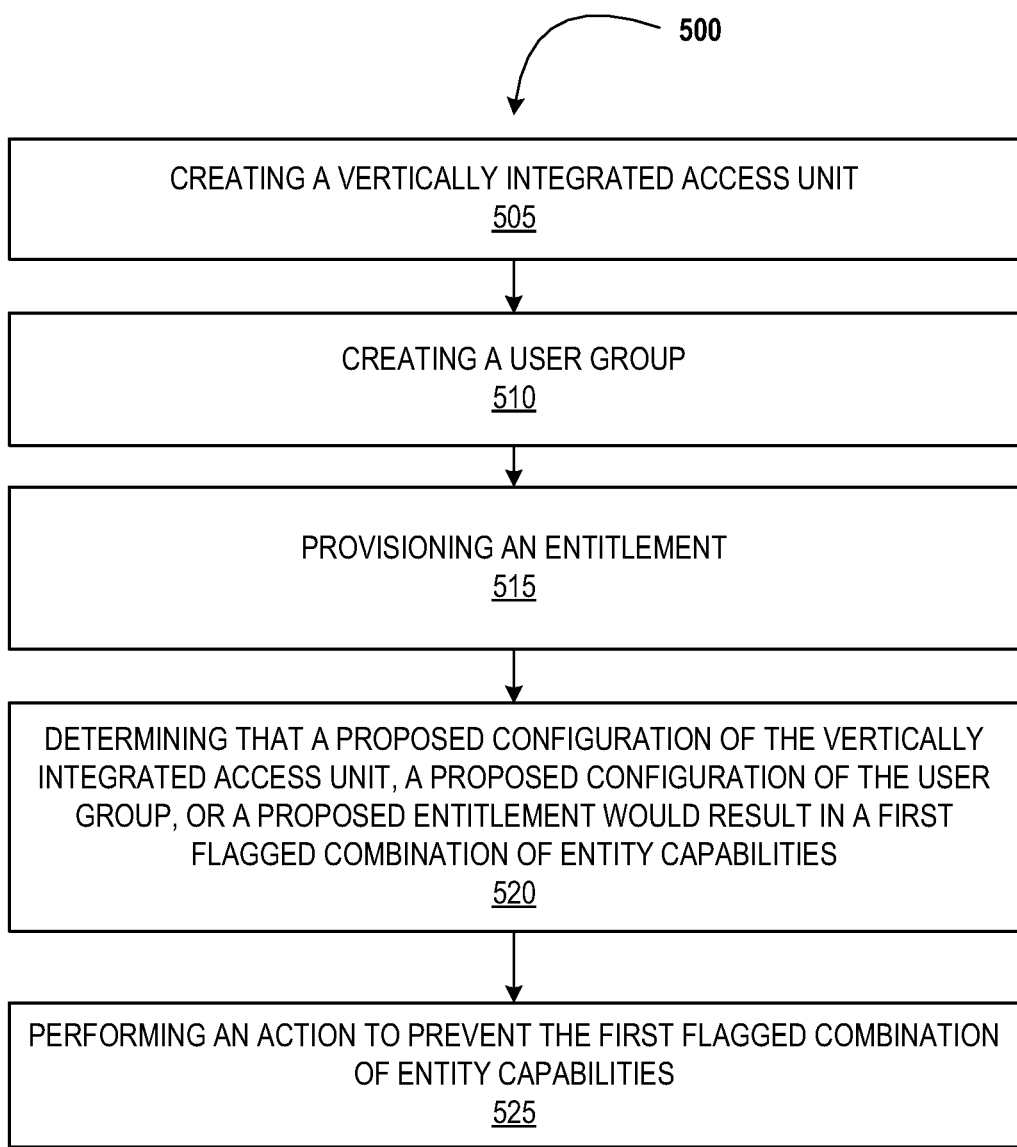
Figure 6:
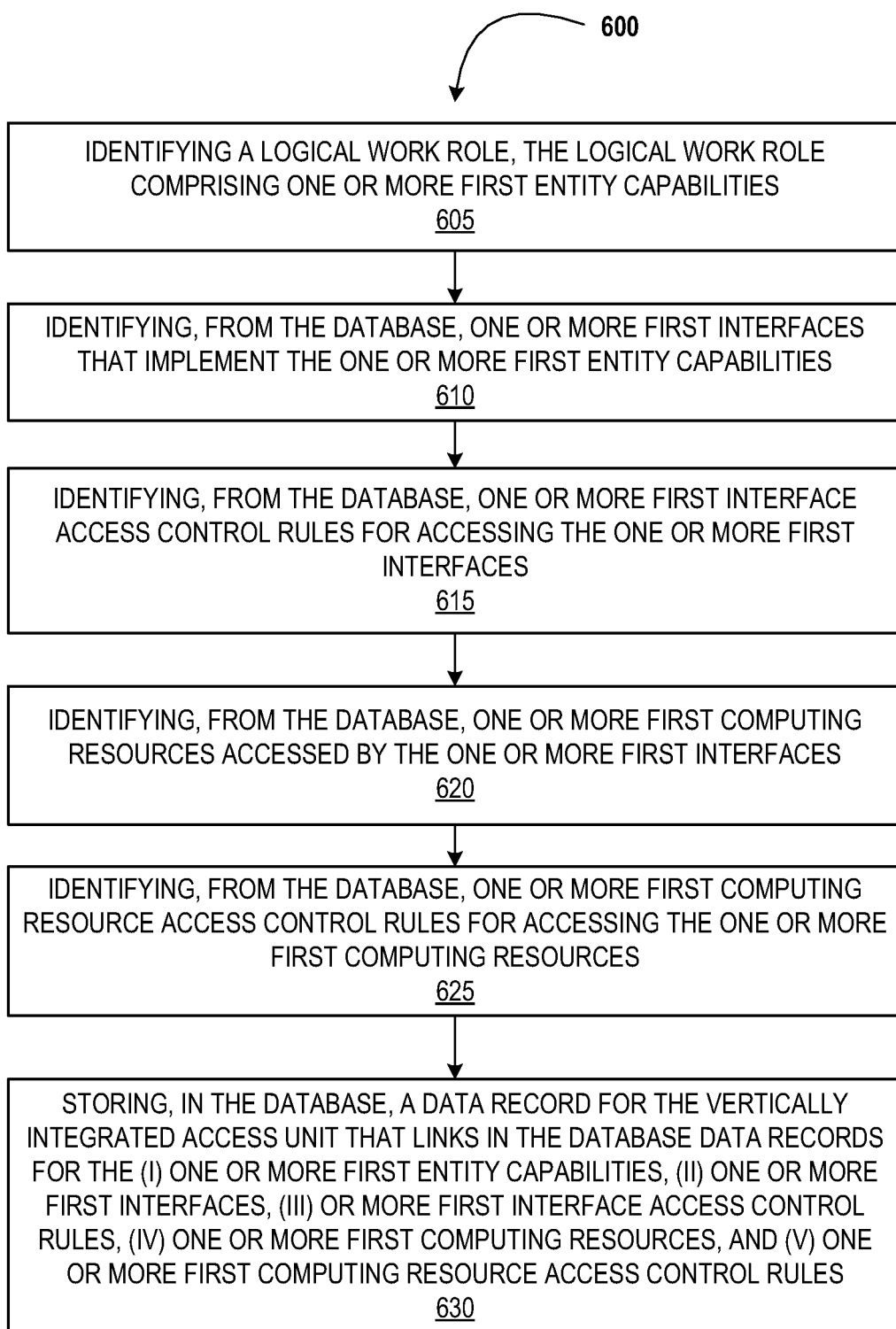

Having thus described embodiments of the invention in general terms, reference will now be made the accompanying drawings, wherein:

FIG. 1 depicts an operating environment and vertically integrated access control system in accordance with an exemplary embodiment of the present invention;

FIG. 2 schematically depicts a vertically integrated access control system in accordance with an exemplary embodiment of the present invention;

FIGS. 3A-3B depict a method of populating a database and linking together related entity capabilities, interfaces, computing resources, and access control rules in accordance with an exemplary embodiment of the present invention;

FIG. 4 depicts a method for identifying and remediating flagged combinations of entity capabilities that result from entitlements that have been provisioned to a particular user in accordance with an exemplary embodiment of the present invention;

FIG. 5 depicts a method for creating user entitlements that do not result in a flagged combination of entity capabilities in accordance with an exemplary embodiment of the present invention; and FIG. 6 depicts a method for creating a vertically integrated access unit in accordance with an exemplary embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

"Computing resources" are the hardware and software components that make up information systems. "Applications," "interfaces," "networks," and "devices" are types of computing resources. A "device" is typically any type of electronic device within an information system, such as workstations, personal computers, tablets, smartphones, servers, telephones, storage devices, network, devices, and the like. "Applications" is typically an integrated set of computer programs that is used to achieve one or more related technical or entity objectives and typically refer to the software, interactions, and applications flows on the devices. "Networks" are typically the connections and traffics flowing among the devices and applications.

An "application component" is typically a sequential file containing executable program code. An application is composed of application components. An application component is typically composed of: (i) a set one or more capabilities and (ii) application component rules that supply the sequential and conditional logic for implementing the capabilities. Application component methods are types of application component rules. An "application component method" is the implementation of an operation of an application component. It specifies the algorithm or procedure that produces the results of an operation of an application component. An application component method is typically specified as a procedural expression, a linguistic string in a designated language (e.g. C++) that describes an algorithm.

A "resource manager" is a type of application that coordinates and integrates the interaction of computing resources at run-time. The capabilities needed to perform this function will vary depending on the nature of the computing resources being managed. An operating system a type computing resource manager. Most operating systems have a set of common capabilities such as memory management, process management and storage management, the exact nature of these will vary depending on the nature the device. Not all resource managers are operating systems. An application may function as a resource managers under the control of an operating system.

A "resource access manager" is an application that is responsible for controlling access to its computing resources and data objects. A resource access manager may be a component of a resource manager itself or it may be a separate application to which access control authority has been delegated by the resource manager. For example, a zOS mainframe can natively control access to its resources or use an external resource access manager, such as Resource Access Control Facility (RACF) or CA Top Secret, to manage access control.

An "interface" exposes applications to human and application users via a human user interface (e.g., a graphical user interface) and/or an application programming interface (API). In this regard, an interface defines a facade that provides access to the capabilities that that are implemented by application components behind the facade.

A "capability" is an abstraction of an aptitude or a competency that contributes to an outcome. These outcomes relate to both entity and technical activities. A capability can be composed of other capabilities. This allows a capability's functional scope to range from very broad to very granular.

An "entity" may be any person or organization implementing a vertically integrated access control system in an information system described herein.

An "entity capability" refers to an aptitude or competency that an entity may possess or require at an entity, business function, or individual level that has the potential, or is required to contribute to a business outcome thereby creating value. An "entity capability" typically has a business objective rather than a technical objective. A "logical work role" is a collection of entity capabilities that are associated with a relevant set of knowledge, skills and abilities. For example, a logical work role may be associated with to a set of related tasks that may be performed a category of employees of an entity.

An "access control rule" is a rule that is implemented by a resource access manager to control access to its computing resources. An access control rule can be: (i) basic access rights such as "open" or "close" applied to a file or a database or "start" or "stop" applied to a process or task; (ii) more complex logical that takes context and user attributes into consideration and (iii) elevated privilege access rules that are used by a resource access manager to determine the computing resources associated with an elevated privilege and the actions that can be performed on those computing resources by a user requesting access. Root access is an example of an elevated privilege.

A "permission" is a set of access control rules that relate to a particular computing resource. A permission typically has a single permission name and a description of the permission (e.g., a description of the access rights provided by the permission). An "entitlement" links a permission (or access control rule) either directly to a user account or indirectly to a user account via its membership in a user group. In effect, an entitlement provides a user with use of a particular computing resource.

A "user" is a role assumed by an actor when the actor performs actions involving computing resources. Humans (e.g., employees of an entity) and applications are types of actors. Each user may be linked directly or indirectly via a user group to a user account. A "user account" is how: (i) a resource manager accounts for the use of its computing resources and (ii) a resource access manager controls access to the computing resources under its control. A "user group" is a named set of user accounts and other user groups, which may be created for improving the efficiency of how entitlements are administered. Typically, when a user group receives a permission, all of the user accounts that are members of a user group receive the permission. A user group may be a member of another user group. An "inheritance rule" defines whether a child user group inherits the permissions from a parent group, a grandparent group, a great-grandparent group and the like.

An information system typically includes many different resource access managers that can create and manage entitlements for users to access computing resources of the information system. Due to the many different resource access managers within an information system, it is difficult organize and control user entitlements. Another problem is that resource access managers typically document and provide information regarding the entitlements they manage in terms of the access to computing resources afforded by such entitlements. Accordingly, although it is possible to determine what technical capabilities a user has based on the entitlements assigned to the user, it is difficult to determine the entity capabilities such entitlements allow the user to perform. For example, although it may be possible to determine from a resource access manager that a particular user has an entitlement to access a software application, it is difficult to determine the entity capabilities that can be performed by the user as a consequence of being entitled to access such software.

Because it is difficult to determine the entity capabilities a user's entitlements allow such user to perform, it is also difficult to determine whether a user's entitlements create any flagged combinations of entity capabilities. A "flagged combination of entity capabilities" is a combination of two or more entity capabilities such that the combination can lead to a separation of duties conflict. Separation of duties is a basic internal control principle that aims at preventing errors and/or irregularities by separating the performance of a task from the approval or the checking of the work output of the task. An example of a flagged combination of entity capabilities is when a software developer has authority to both (i) load a program to a test library and (ii) then to move that program from the test library to production. Such combination of capabilities could lead to unauthorized code changes that can be either faulty or malicious. As such, the entity capabilities of (i) loading a program to a test library and (ii) moving that program from the test library to production, should not be combined into the same entity work role that may be performed by a single user. However, staying in the same example, a particular user's entitlements to various computing resources (e.g., applications) may afford such user the ability to both (i) load a program to a test library and (ii) then to move that program from the test library to production. That said, it is difficult to determine from current resource access managers whether a user's entitlements allow such user to perform a flagged combination of entity capabilities.

To address these problems, the present invention is directed to a vertically integrated access control system that may be deployed within an information system of an entity and that is configured to identify, prevent, and/or remediate flagged combinations of entity capabilities that may be created as a result of entitlements provisioned to users of the information system. The vertically integrated access control system links entity capabilities with the computing resources of the information system, thereby facilitating the identification of entity capabilities afforded by particular entitlements. Because the vertically integrated access control system is able to identify entity capabilities associated with a particular entitlement, the vertically integrated access control system can then determine if such entitlement creates any flagged combinations of entity capabilities and, if applicable prevent and/or remediate any identified flagged combinations of entity capabilities.

The vertically integrated access control system typically maintains an inventory of entity capabilities of the entity. The vertically integrated access control system also typically maintains an inventory of computing resources, access control rules, and interfaces of the information system. Related entity capabilities, interfaces, computing resources, and access control rules are linked together in a database. Because the vertically integrated access control system maintains a database linking related entity capabilities, interfaces, computing resources, and access control rules, the vertically integrated access control system can readily determine the entity capabilities that a user's entitlements allow the user to perform. Based on determining the entity capabilities provided by the user's entitlements, the vertically integrated access control system can then automatically determine whether the user is permitted to perform any flagged combination of entity capabilities. In response to determining that the user is permitted to perform such flagged combination of entity capabilities, the vertically integrated access control system may perform an information security action to remediate such flagged combination, such as by removing, suspending, or modifying one or more entitlements of the user such that the user no longer has the ability to perform any flagged combination of entity capabilities.

The vertically integrated access control system may also be utilized to form entitlements that do not result in a flagged combination of entity capabilities. As noted above, the vertically integrated access control system maintains a database linking related entity capabilities, interfaces, computing resources, and access control rules. This database may be used to facilitate the formation of vertically integrated access units. Such vertically integrated access units may then be used as the basis for creating entitlements within the information system. A "vertically integrated access unit" links one or more entity capabilities to: (i) the interface(s) that expose such entity capabilities, (ii) the computing resource(s) accessed by such interface(s) and to (iii) the access control rules for accessing such interface(s) and computing resource(s). Typically, each vertically integrated access unit relates to a set of related entity capabilities, such as the entity capabilities of a particular logical work role. Therefore, a vertically integrated access unit typically includes the access control rules needed to perform a set of related entity capabilities. Users that need to perform such related entity capabilities (e.g., in connection with such user's logical work role) are assigned to a user group associated with such related entity capabilities (e.g., a user group associated with such logical work role). The access control rules in the vertically integrated access unit are typically bundled together into one or more permissions and then linked to the users in the user group, thereby forming entitlements. Because the user group and vertically integrated access unit typically relate to the same set of related entity capabilities, the vertically integrated access control system in this manner may be used to provision entitlements that are tailored to the entity capabilities that users have a need to perform. Similar to the identification of flagged combination of entity capabilities as described above, the vertically integrated access control system typically monitors (e.g., in real-time) the formation of vertically integrated access units, the formation of user groups, and the provisioning of entitlements based on vertically integrated access units to ensure that no flagged combination of entity capabilities are created. For example, if a user of the vertically integrated access control system wishes to add a particular entity capability to a vertically integrated access unit that would result in a flagged combination of entity capabilities, the vertically integrated access control system may prevent the addition of such entity capability to the vertically integrated access unit. By way of further example, if a user of the system tries to link a vertically integrated access unit to a user group to form an entitlement that would result in a particular user of the being able to perform a flagged combination of entity capabilities, the vertically integrated access control system may remove such user from the user group or remove one or more entitlements of the user such that the user is not able perform a flagged combination of entity capabilities.

FIG. 1 depicts an operating environment 100 according to one embodiment of the present invention. As depicted in FIG. 1, the operating environment 100 typically includes an information system 150 owned and/or operated by an entity. The information system is typically a computer-based information system. Accordingly, the information system 150 typically includes a plurality of devices, such as a server 151 and a workstation 152, as well as other computer and technology based resources (e.g., devices, networks, and software applications). The devices within the information system 150 may be configured to operate one or more applications. The information system 150 also typically includes one or more resource access managers 155 that control access to the computing resources of the information system 150. The devices within the information system 150 are typically configured to communicate with one another, other devices operated by the entity, and devices operated by third parties (e.g., customers), via a network 110. The network 110 may be any type of network, such as the Internet, wide area network, local area network, Bluetooth® network, near field network, and/or any other form of contact or contactless network. The information system 150 may include all devices, applications, and networks operated by the entity or may include a subset of such devices, applications, and networks.

The operating environment 100 also typically includes a vertically integrated access control system 200. The system 200 may be in communication with one or more users, each having a user computing device 120, such as a PC, laptop, mobile phone, tablet, television, mobile device, wearable device, or the like (e.g., via the network 110). In some embodiments, the system 200 and/or user computing devices 120 may be part of the information system 150. Such users may also have access to one or more of the computing resources (e.g., applications) of the information system 150. The one or more resource access managers 155 of the information system 150 are typically configured to control such users' access to the computing resources of the information system 150.

FIG. 2 depicts the vertically integrated access control system 200 (also referred to as the "system 200") in more detail. As depicted in FIG. 2, the system 200 typically includes various features such as a network communication interface 210, a processing device 220, and a memory device 250. The network communication interface 210 includes a device that allows the system 200 to communicate with information system 150 and user computing devices 120 (e.g., over the network 110 (shown in FIG. 1)).

As used herein, a "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices (e.g., processors) according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 250, generally refers to a device or combination of devices that store one or more forms of computer-readable media for storing data and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

As noted, in some embodiments the system 200 is configured to form entitlements that do not result in a flagged combination of entity capabilities. Moreover, in some embodiments the system 200 is configured to identify any entitlements that cause flagged combinations of entity capabilities and then remediate identified flagged combinations of entity capabilities. Accordingly, the system 200 typically includes one or more modules stored in the memory device 250, which facilitate the management of entitlements and the identification, remediation, and prevention of flagged combination of entity capabilities. As depicted in FIG. 2, the system 200 typically includes an access control module 255 that is configured to manage entitlements and identify, remediate, and/or prevent of flagged combination of entity capabilities. In addition, the system 200 typically includes a database 260. In this database 260, the system 200 typically maintains inventory of entity capabilities of the entity, as well as an inventory of computing resources, access control rules, and interfaces of the information system. Related entity capabilities, interfaces, computing resources, and access control rules are typically linked together in the database 260. Data records in the database 260 can be linked directly or indirectly (e.g., due to an intervening data record). For example, a data record corresponding to a particular entity capability may be directly linked to a data record corresponding to a particular interface that implements such capability. Moreover, such data recording corresponding to such particular interface may be directly linked to (e.g., by directly referencing) a data record corresponding to a particular access control rule for access such interface. Therefore, such data record corresponding to such particular entity capability and such data record corresponding to such particular access control rule would be "indirectly" linked by virtue of such intervening data recording corresponding to such particular interface, thereby facilitating identification of the relationship between such particular access control rule and such particular entity capability (e.g., that such particular access control rule may be required to implement such particular entity capability).

As explained in more detail herein, the database 260 may be used by the system 200 to identify flagged combinations of entity capabilities that may result from entitlements. In some embodiments, the database may be uploaded to the system 200. In other embodiments, the system 200 may be configured to create the database 260.

In some embodiments, the database 260 is a graph database. A graph database is a particular type of database in which a graph structure is used to represent the relationships among different data items. In a graph database, a "node" represents a particular data item or record. A graph database further includes "edges" which define how different nodes relate to one another. Accordingly, each node in the graph database may correspond to a particular entity capability, flagged combination of entity capabilities, interface, computing resource, access control rule, user, user group, or any other particular type of data record that may be stored in the database 260. Relationships between entity capabilities, interfaces, computing resources, access control rules, and other types of data records may be represented by "edges" between such nodes of the database 260. For example, nodes corresponding to a particular computing resource and a particular interface may be linked by an edge specifying that such interface accesses such computing resource.

In this regard, FIGS. 3A-3B depicts a method 300 of populating the database 260 and linking together related entity capabilities, interfaces, computing resources, and access control rules, which may be performed by the access control module 255.

At block 305, the system 200 typically collects information regarding a plurality of entity capabilities of the entity. As described above, an entity capability is a capability of the entity that typically has a business objective rather than a technical objective. For example, if the entity is in the business of developing software, capabilities of the entity may include: (i) writing code for a software program, (ii) loading the software program to a test library, (iii) testing the software program, and (iv) moving the software program from the test library to production.

Collecting the information regarding the plurality of entity capabilities of the entity typically includes receiving such information (e.g., via a graphical user interface) from one or more users of the system 200, who may be knowledgeable individuals within the entity. In other words, users of the system 200 may define the plurality of entity capabilities of the entity and then provide this information to the system 200.

At block 310, the system 200 typically stores in a database (e.g., the database 260) a plurality of entity capability data records, where each entity capability data record corresponds to and includes information regarding a particular entity capability.

In some embodiments, the system 200 may collect information regarding logical work roles of the entity. Each logical work role is typically associated with one or more related entity capabilities. Each logical work role, as well as the entity capabilities of each logical work role, may be defined by a user of the system 200. A data record may be created by the system 200 for each logical work role. The data record for each logical work role may then be linked to the data records for the entities capabilities related to such logical work role. Referring to the previous example, the logical work role of "software testing" may include the entity capabilities of (i) loading a software program to a test library and (ii) testing the software program. Accordingly, a data record for the logical work role of "software testing" may be created in the database and linked to the data records for the entity capabilities of (i) loading a software program to a test library and (ii) testing the software program.

At block 315, the system 200 typically collects information regarding a plurality of flagged combinations of entity capabilities. As described above, a flagged combinations of entity capabilities is a problematic combination of entity capabilities of the entity. Referring to the previous example, the entity capabilities of (i) testing a software program and (ii) moving the software program from a test library to production may constitute a flagged combinations of entity capabilities, as it may be desirable to ensure that the same individual cannot both test a software program and move the software program to production. Typically, users of the system 200 define the flagged combinations of entity capabilities and then provide this information to the system 200.

At block 320, the system 200 typically stores in a database (e.g., the database 260) a plurality of flagged combination data records, where each flagged combination data record corresponds to a particular flagged combination of entity capabilities. Each flagged combination data record may be linked in the database to the entity capability data records of the entity capabilities constituting a particular flagged combination.

At block 325, the system 200 typically collects information regarding interfaces within the information system 150. As noted, interface is typically a human user interface (e.g., a graphical user interface) and/or an application programming interface (API) that provides access to the capabilities that that are implemented by application components.

At block 330, the system 200 typically collects information regarding access control rules of the information system 150. As noted, an access control rule is a rule that is implemented by a resource access manager to control access to its computing resources. The system 200 also typically collects information regarding permissions of the information system 150. As noted, a permission is a set of access control rules that relate to a particular computing resource.

At block 335, the system 200 typically collects information regarding computing resources of the information system 150. These computing resources typically include applications, application components, and application component methods. As such, this information typically includes information regarding the applications and application components of the information system 150, as well as information regarding the application component methods of such application components.

Typically, users of the system 200 identify the interfaces, access control rules, and computing resources of the information system 150 (as well as any other related information collected in with respect to blocks 325-335) and then provide this information to the system 200. That said, it is within the scope of the present invention for the system 200 to have the capability of automatically identifying and collecting at least some of this information without user interaction.

At block 340, the system 200 typically stores in a database (e.g., the database 260) a plurality of data records corresponding to the interfaces, access control rules, and computing resources of the information system 150. In this regard, each data record typically corresponds to a particular item (e.g., a particular interface, access control rule, or computing resource). As noted above, the system 200 may collect information regarding permissions of the information system 150. Accordingly, a data record may be stored for each permission. Moreover, for each permission, the data record for such permission may be linked to the data records of the access control rules within such permission. Also, the data records for the computing resources may include data records for the applications, application components, and application component methods of the information system 150. Data records for related applications, application components, and application component methods may be linked together in the database.

At block 345, for each entity capability, such entity capability is typically linked in the database to each interface that implements such entity capability. In other words, the data record for such entity capability is typically linked to the data record for each interface that implements such entity capability. Information regarding the relationships between the entity capabilities and the interfaces of the information system 150 (e.g., which entity capabilities are implemented by a particular interface) is typically supplied by one or more users of the system 200. Based on this information, the system 200 may then link together the data records for the entity capabilities and interfaces.

At block 350, for each interface, such interface is typically linked in the database to each access control rule for accessing such interface. In other words, the data record for such interface is typically linked to the data record for each access control rule for accessing such interface. By way of example, a particular interface may be a graphical user interface (GUI) that performs a particular function, and a particular access control rule may define a set of users that are allowed to access such GUI. Information regarding the relationships between the interfaces and the access control rules for accessing such interfaces is typically supplied by one or more users of the system 200. Based on this information, the system 200 may then link together the data records for the access control rules and interfaces. Related access control rules and interfaces may be linked directly or indirectly. For example, a particular interface may be directly linked to a particular permission that allows access to such interface, thereby indirectly linking the access control rules included in such permission with such interface. Alternatively, such interface may be directly linked to an access control rule that allows access to such interface, thereby indirectly linking a permission including such access control rule with such interface.

At block 355, for each computing resource, such computing resource is typically linked in the database to each access control rule for accessing such computing resource. In other words, the data record for such computing resource is typically linked to the data record for each access control rule for accessing such computing resource. Information regarding the relationships between the computing resources and the access control rules for accessing such computing resources is typically supplied by one or more users of the system 200. Based on this information, the system 200 may then link together the data records for the access control rules and computing resources. Related access control rules and computing resources may be linked directly or indirectly. For example, a particular computing resource may be directly linked to a particular permission that allows access to such computing resource, thereby indirectly linking the access control rules included in such permission with such computing resource. Alternatively, such computing resource may be directly linked to an access control rule that allows access to such computing resource, thereby indirectly linking a permission including such access control rule with such computing resource.

As described above, computing resources may include applications, application components, and application component methods. In some embodiments, linking computing resources to access control rules in the database may include, for each application component method, linking such application component method to each access control rule for accessing such application component method.

At block 360, for each interface, such interface is typically linked in the database to each computing resource accessed by such interface. In other words, the data record for such interface is typically linked to the data record for computing resource accessed by such interface. In some embodiments, for each interface, such interface is typically linked in the database to each application component method accessed by such interface.

Information regarding the relationships between the interfaces and the computing resources accessed by such interfaces is typically supplied by one or more users of the system 200. Based on this information, the system 200 may then link together the data records for the interfaces and computing resources.

Once the database 260 has been populated and the data records for related entity capabilities, interfaces, computing resources, and access control rules have been linked as described above, the database 260 may then be used by the system 200 to identify which entity capabilities and logical work roles are related to particular permissions and access control rules. Therefore, the system 200 may be able to use the database 260 to determine if any flagged combinations of entity capabilities are associated with a particular permission or access control rule. Moreover, the system 200 may be able to use the database 260 to determine which permissions and/or access control rules are needed to implement a particular entity capability or logical work role.

In some embodiments, the database 260 may also be used to maintain an inventory of users, user groups, and entitlements of the information system 150. In this regard, the system 200 may collect information regarding users and user accounts of the information system 150. A data record may then be stored in the database 260 for each user and user account. The data record for each user may then be linked to the data record(s) for each user account of such user. In some embodiments, the system 200 also collects information regarding the logical work role(s) performed by/assigned to each user. Each user may then be linked in the database 260 to such user's logical work role(s), which as noted above may be stored as separate records in the database 260.

The system 200 may further collect information regarding user groups within the information system 150. A data record may then be stored in the database 260 for each user group. The data record for each user group may then be linked to the data record(s) for each user and/or user account assigned to such user group. In some embodiments, the system 200 also collects information regarding the logical work role(s) performed by/assigned to each user group. Each user group may then be linked in the database 260 to such user group's logical work role(s).

Additionally, the system 200 may collect information regarding the entitlements that have been provisioned to each user. As noted above, an entitlement links a permission either directly to a user account or indirectly to a user account via its membership in a user group. A data record may then be stored in the database 260 for each entitlement. The data record for each entitlement may then be linked (e.g., directly or indirectly) to the data record for each user and/or user account to which such entitlement has been provisioned. The data record for each entitlement is also typically linked to the data record for the permission(s) and access control rule(s) associated with such entitlement. The system 200 may also collect information regarding the permissions that have been assigned to each user group. The data record for each permission (and its access control rules) may then be linked to the data record for each user group to which such permission (and its access control rules) has been assigned.

Typically, users of the system 200 provide the above information related to users, user groups, and entitlements to the system 200. That said, in some embodiments, the system 200 may be configured to collect such information automatically, such as from resource access managers 155 of the information system 150.

The system 200 is typically configured to allow users of the system 200 to change the information in the database 260 regarding the entity capabilities, interfaces, computing resources, access control rules, logical work roles, users, user groups, entitlements, and the like of the information system 150. For example, (i) entity capabilities, interfaces, computing resources, access control rules, logical work roles, users, user groups, or entitlements may be added to or removed from the database, (ii) entity capabilities may be added to or removed from a logical work role, (iii) users may be added to or removed from a user group, or (iv) additional logical work roles may be assigned to a user or user group. Based on any such changes, the system 200 is typically configured to make corresponding updates to the links between the data records the database 260 (e.g., the data records for entity capabilities, interfaces, computing resources, access control rules, logical work roles, users, user groups, and/or entitlements).

As described above, in some embodiments, the system 200 may be configured to identify and remediate flagged combinations of entity capabilities that arise from existing user entitlements. In this regard, FIG. 4 depicts a method 400 for identifying and remediating flagged combinations of entity capabilities that result from entitlements that have been provisioned to a particular user.

At block 405, the system 200 identifies entitlements of a first user within the information system 150. As noted above, an entitlement links a permission either directly to a user account or indirectly to a user account via its membership in a user group. As described above, the database 260 typically already include data records related the users of the information 150, as well as such users' entitlements. As such, the system 200 may identify the data record within the database 260 that corresponds to the first user to thereby identify the entitlements that have been provisioned to the first user.

At block 410, based on the entitlements of the first user, the system 200 identifies the access control rules assigned to the first user. As described above, each entitlement is typically linked in the database 260 to its associated permission, and each permission is typically linked in the database 260 to the access control rules included within such permission. Such linking therefore facilitates the identification by the system 200 of the access control rules assigned to the first user.

At block 415, the system 200 identifies entity capabilities of the first user by identifying entity capabilities linked in the database 260 to the access control rules assigned to the first user. In other words, the system 200 identifies which entity capabilities the first user can perform by virtue of such access control rules. As described above, data records for related entity capabilities, interfaces, computing resources, and access control rules are typically linked together in the database 260. Based on such linking, the system 200 is able to identify the entity capabilities associated with particular access control rules, and, therefore, the system can identifies the entity capabilities of the first user from the access control rules assigned to the first user.

At block 420, the system 200 compares the entity capabilities of the first user to known flagged combinations of entity capabilities. As described above, flagged combinations of entity capabilities are typically stored in the database 260.

At block 425, in response to comparing the entity capabilities of the first user to the plurality of flagged combinations of entity capabilities, the system 200 determines that the entity capabilities of the first user include a first flagged combinations of entity capabilities (e.g., a subset of the first user's entity capabilities match the entity capabilities of a particular flagged combination data record). Alternatively, if the system 200 determines that the entity capabilities of the first user do not include any flagged combinations of entity capabilities, then the system 200 may take no further action with respect to the first user.

In response to determining that the entity capabilities of the first user comprise the first flagged combination of entity capabilities, at block 430, the system 200 performs an information security action to remediate the first flagged combination of entity capabilities. In this regard, the system 200 typically performs one or more actions such that the first user, at least temporarily, no longer has the ability to perform a flagged combination of entity capabilities. In particular, the system 200 may remove, suspend, or modify one or more entitlements of the first user such that the first user no longer has the ability to perform the first flagged combination of entity capabilities. In order to remove, suspend, or modify entitlements, the system 200 may communicate with resource access managers 155 of the information system 150 and cause such resource access managers 155 to make any determined changes to the entitlements. In some embodiments, the system 200 may alert one or more users of the system 200 (e.g., administrators) that a flagged combination of entity capabilities has been provided to the first user.

By way of example, a user may have a first entitlement that permits the user to perform entity capabilities A and B, and the user may have a second entitlement that permits the user to perform entity capability C. The first entitlement may have been directly provisioned to the user, whereas the second entitlement may have been indirectly provisioned to the user based on the user's membership of a user group. The system 200 may determine that entity capabilities A and C constitute a flagged combination of entity capabilities. Accordingly, the system 200 may automatically remove the first entitlement and/or the second entitlement from the user. Because the second entitlement was provisioned to the user based on the user's membership of the user group, the system 200 may remove the second entitlement from the user by removing the user from the user group. As an alternative to automatically removing either the first or second entitlement from the user, the system 200 may automatically suspend the first entitlement and/or the second entitlement (e.g., by suspending the user's membership of the user group), such as until an appropriate user (e.g., administrator) of the system 200 decides to implement an alternative action for remediating the flagged combination of entity capabilities. As a further alternative, the system may automatically modify the first entitlement by removing entity capability A from the first entitlement to eliminate flagged combination of entity capabilities.

In some embodiments, the action(s) taken by the system to remediate a flagged combination of entity capabilities may depend upon the logical work role(s) assigned to a user that has a flagged combination of entity capabilities. In particular, when remediating a flagged combination of entity capabilities, the system 200 may seek, if possible, to ensure a user can continue to perform any logical work roles to which such user has been assigned. Referring to the previous example, the user may have been assigned a logical work role that includes entity capability B. Therefore, in order to ensure that the user can perform this logical work role, the system 200 may remedy the flagged combination by either removing (or suspending) the second entitlement from the user or removing entity capability A from the first entitlement, so that the user still has the ability to perform entity capability B.

The foregoing method 400 for identifying and remediating flagged combinations of entity capabilities may be repeated for each user of the information system 150.

As noted, in some embodiments the system 200 is configured to form entitlements that do not result in a flagged combination of entity capabilities. Thus, during the process of forming entitlements, the system 200 may be configured to prevent flagged combinations of entity capabilities that would otherwise occur (e.g., from provisioning a particular entitlement to a particular user). In this regard, FIG. 5 depicts a method 500 for creating user entitlements that do not result in a flagged combination of entity capabilities.

At block 505, the system 200 typically creates a vertically integrated access unit. As noted above, a vertically integrated access unit links one or more entity capabilities to: (i) the interface(s) that expose such entity capabilities, (ii) the computing resource(s) accessed by such interface(s) and to (iii) the access control rules for accessing such interface(s) and computing resource(s). Typically, a vertically integrated access unit relates to a particular logical work role and includes the access control rules (which may be bundled into a permission) needed to perform the entity capabilities included in the logical work role.

FIG. 6 depicts an exemplary method 600 for creating a vertically integrated access unit. To create the vertically integrated access unit, at block 605, the system 200 typically first identifies a particular logical work role (e.g., the logical work role upon which the vertically integrated access unit will be based) that includes one or more first entity capabilities. The logical work role may be specified by a user of the system 200. As described above, a logical work role is typically a collection of entity capabilities that are associated with a relevant set of knowledge, skills and abilities. Also as described above, the database 260 may already include a data record associated with the logical work role and first entity capabilities. If a data record for the logical work role has not yet been created, the system 200 may create a data record for the logical work role.

At block 610, the system 200 typically identifies from the database 260 one or more first interfaces that implement the one or more first entity capabilities. In this regard, the system 200 typically identifies from the database 260 the interface data records that are linked to the data records for the first entity capabilities linked to the data record for the logical work role.

At block 615, the system 200 typically identifies from the database 260 one or more first interface access control rules for accessing the one or more first interfaces. As noted, access control rules may be grouped into a permission, and so the system 200 may identify one or more permissions for accessing the one or more first interfaces. The system 200 may identify the one or more first interface access control rules by identifying from the database 260 the interface access control rule data records (or permission data records) that are linked to the data records for the first interfaces.

At block 620, the system 200 typically identifies from the database 260 one or more first computing resources accessed by the one or more first interfaces. In this regard, the system 200 typically identifies from the database 260 the computing resource data records that are linked to the data records for the first interfaces. In some embodiments, the computing resources identified may include applications, application components, and/or application component methods that are accessed by the one or more first interfaces.

At block 625, the system 200 typically identifies from the database 260 one or more first computing resource access control rules for accessing the one or more first computing resources. In this regard, the system 200 typically identifies from the database 260 the computing resource access control rule data records that are linked to the data records for the first computing resources.

Once the interfaces, access control rules, and computing resources used to perform the logical work role have been identified by the system 200, at block 630, the system 200 typically stores in the database 260 a data record for the vertically integrated access unit. The data record for the vertically integrated access unit typically links together the data records for the (i) one or more first entity capabilities, (ii) one or more first interfaces, (iii) or more first interface access control rules, (iv) one or more first computing resources, and (v) one or more first computing resource access control rules.

This method 600 for creating a vertically integrated access unit may be repeated to create additional vertically integrated access units for other logical work roles. As such, the system 200 may be employed to create multiple vertically integrated access units, each vertically integrated access unit being tailored to a particular logical work role and including the access control rules (and/or permission(s)) needed to perform such logical work role.

Returning to FIG. 5, once the vertically integrated access unit has been created, at block 510, the system 200 is typically configured to create a user group. To create the user group, the system 200 typically assigns a logical work role to the user group. The logical work role of the user group is typically the logical work role that users assigned to the user group would be expected to perform for the entity. The logical work role of the user group may be specified by a user of the system 200. To create the user group, system 200 typically stores, in the database 260, a data record for the user group. This data record for the user group is typically linked to the data record for the logical work role.

If the logical work role of the user group matches the logical work role of the vertically integrated access unit (created at block 505), then the system 200 typically links the user group (e.g., the data record for the user group) to such vertically integrated access unit (e.g., the data record for such vertically integrated access unit), thereby linking the user group to the access control rules (and/or permissions) that are needed to perform the logical work role of the user group. Linking the user group to the vertically integrated access unit may be performed in response to a user's (e.g., administrator's) request to do so. If the logical work role of the user group does not match the logical work role of the vertically integrated access unit, then the system 200 is typically configured to not permit the user group to be linked (e.g., by a user of the system 200) to the vertically integrated access unit. In other words, system 200 might not permit a user group to be linked to a vertically integrated access unit that is not related to a logical work role of the user group.

In some embodiments, multiple logical work roles may be linked/assigned to the user group. Accordingly, such user group may be linked to a vertically integrated access unit associated with each logical work role. In addition, the foregoing process may be repeated to create multiple user groups, each user group being linked to a vertically integrated access unit associated with such user group's logical work role.

At block 515, an entitlement is provisioned to a first user. To provision the entitlement, the system 200 typically assigns a logical work role to the first user (or to a user account of the first user). The logical work role of the first user is typically the logical work role that the first user would be expected to perform for the entity. The logical work role of the first user may be specified by a user (e.g., administrator) of the system 200. If a data record for the first user has not already been created, the system 200 typically stores, in the database 260, a data record for the first user. The data record for the first user is typically linked to the data record for the logical work role.

If the logical work role of the first user matches the logical work role of the user group (created at block 510), then the system 200 typically links the first user (e.g., the data record for the first user or a user account of the first user) to such user group (e.g., the data record for such user group). If the logical work role of the first user does not match the logical work role of the user group, then the system 200 is typically configured to not permit the first user to be linked to the user group. In other words, system 200 might not permit a user to be linked to a user group that is not related to a logical work role of such user.

Once the entitlement has been provisioned, the system 200 may provide the resource access managers 155 of the information system 150 with information about the entitlement so that the resource access managers 155 can implement the entitlement within the information system 150.

The linking of the first user to the user group thereby provisions the entitlement. In particular, linking the first user to the user group thereby links the first user to vertically integrated access unit linked to the user group and thus to the access control rules (and/or permissions) that are needed to perform the logical work role of the first user.

In some embodiments, multiple logical work roles may be linked/assigned to the first user. Accordingly, such first user may be linked to a user group associated with each logical work role, and so multiple entitlements may be provisioned to such user. In addition, the foregoing process may be repeated to provision entitlements to multiple users, each user being linked to a vertically integrated access unit associated with such user's logical work role.

By creating a vertically integrated access unit and user group tailored to a particular logical work role and then assigning a user with a need to perform such logical work role to such user as described above, an entitlement can be provisioned to the user, such that the user has access to the computing resources and interfaces need to the perform the user's logical work role, but without providing the user with access right unrelated to the user's logical work role.

The system 200 is also typically configured to ensure that this process does not result in a user being granted the ability to perform a flagged combination of entity capabilities. Therefore, the system 200 is typically configured to continuously determine whether a proposed configuration of the vertically integrated access unit, a proposed configuration of the user group, a proposed configuration of the first user, or a proposed entitlement would result in a flagged combination of entity capabilities. This monitoring typically occurs during the steps of (i) creating the vertically integrated access unit (block 505), (ii) creating the user group (block 510), and (iii) provisioning the entitlement (block 515). This monitoring also typically occurs during any subsequent modifications of the vertically integrated access unit, the user group, the first user, or the entitlement.

Typically, a proposed configuration of a vertically integrated access unit, a proposed configuration of a user group, a proposed configuration of a user, or a proposed entitlement is any proposed creation of, configuration of, or change to a vertically integrated access unit, a user group, a user, an entitlement, or any component thereof, which is typically submitted to the system 200 by a user (e.g., an administrator), such as via a graphical user interface. A proposed configuration of the vertically integrated access unit may include a request to add a logical work role to a vertically integrated access unit. A proposed configuration of the vertically integrated access unit may also include a request to add a particular entity capability to a logical work role. A proposed configuration of the user group may include a request to add a logical work role to the user group, a request to link the user group to a particular vertical access unit, or a request to link the user group to any other permission or access control rule. A proposed configuration of the first user may include a request to add a logical work role to the first user. A proposed entitlement may include (i) a request to add the first user to a particular user group to thereby link the first user to the permissions/access control rules linked to such user group or (ii) a request to directly link the first user to a particular permission or access control rule.

There are numerous ways in which the system 200 may determine that a proposed configuration of the vertically integrated access unit, a proposed configuration of the user group, proposed configuration of a user, or a proposed entitlement would result in a flagged combination of entity capabilities.

By way of example, during the process of creating a vertically integrated access unit, the system 200 may determine that linking a particular logical work role to the vertically integrated access unit would result in a flagged combination of entity capabilities. Such flagged combination of entity capabilities might be identified based on the entity capabilities that are included in the logical work role including a flagged combination of entity capabilities (i.e., the entity capabilities of the logical work role (or a subset thereof) match the entity capabilities of a flagged combination of entity capabilities). Such flagged combination of entity capabilities might be identified at the time the logical work role is added to the database 260 or when adding a new entity capability to the logical work role. Alternatively, a flagged combination of entity capabilities might result from combining the entity capabilities of the logical work role with the entity capabilities of another logical work role already linked to the vertically integrated access unit.

In some instances, the access control rules (or permissions) needed to perform a particular logical work role might enable some entity capabilities that are not included in such logical work role (e.g., a logical work role might include entity capability A, but the access control rules to perform entity capability A might also enable entity capability B to be performed). Accordingly, a flagged combination of entity capabilities might result from the entity capabilities linked in the database 260 to the access control rules needed to perform such logical work role, even though the entity capabilities included in such logical work role might not include a flagged combination of entity capabilities.

A proposed configuration of a user group may relate to a request to link a particular logical work role to a user group. Accordingly, the system 200 may determine whether linking the logical work role to the user group would result in a flagged combination of entity capabilities. Such flagged combination of entity capabilities might result from combining the entity capabilities of the logical work role with the entity capabilities of another logical work role already linked to the user group.

A proposed configuration of a user group may also relate to a request to link a particular vertically integrated access unit to a user group. Accordingly, the system 200 may determine whether linking the vertically integrated access unit to the user group would result in a flagged combination of entity capabilities. In some embodiments, the system 200 may (i) identify all of the access control rules (and/or permissions) would be linked to the user group as a result of the vertically integrated access unit, as well as all of the access control rules (and/or permissions) already linked to the user, (ii) identify all of the entity capabilities that would be enabled by such access control rules, and (iii) then determine if any of such entity capabilities match any flagged combination of entity capabilities. In this regard, the access control rules (or permissions) linked to the user group typically include the access control rules (or permissions) directly associated with such group and, depending on defined inheritance rules, may include access control rules (or permissions) from a parent group, a grandparent group, a great-grandparent group or the like.

A proposed configuration of a user may relate to a request to assign a logical work role to a user. Accordingly, the system 200 may determine whether linking the particular logical work role to the user would result in a flagged combination of entity capabilities. In this regard, the entity capabilities of such logical work role once combined with the entity capabilities already linked to the user (e.g., (i) entity capabilities included in other logical work roles already assigned to the user or (ii) entity capabilities enabled by access control rules and/or permissions already linked to the user from existing entitlements) might result in result in a flagged combination of entity capabilities. The entity capabilities already linked to the user may be linked to the user by virtue of the user's membership in one or more user groups or through permissions (or access control rules) directly linked to a user account of the user.

A proposed entitlement may relate to a request add a user to a particular user group. Accordingly, the system 200 may determine whether adding user to the user group would result in a flagged combination of entity capabilities. In this regard, the entity capabilities already linked to the user (e.g., (i) entity capabilities included in other logical work roles already assigned to the user or (ii) entity capabilities enabled by access control rules and/or permissions already linked to the user from existing entitlements) when combined with the entity capabilities already linked to the user group (e.g., entity capabilities enabled by access control rules/permissions already linked to the user group) might result in result in a flagged combination of entity capabilities. As noted above, the entity capabilities already linked to the user may be linked to the user by virtue of the user's membership in one or more user groups or through permissions (or access control rules) directly linked to a user account of the user. Also as noted above, the access control rules/permissions linked to a user group typically include the access control rules/permissions directly associated with such group and, depending on defined inheritance rules, may include access control rules/permissions from a parent group, a grandparent group, a great-grandparent group or the like.

If, at block 520, the system determines that a proposed configuration of the vertically integrated access unit, a proposed configuration of the user group, a proposed configuration of the first user, or a proposed entitlement would result in a first flagged combination of entity capabilities, then, at block 525, in response to such determination, the system 200 typically performs an action to prevent the first flagged combination of entity capabilities.

Such action may include rejecting (e.g., blocking implementation of) the proposed configuration. For example, if an administrator of the system 200 requests to add a logical work role to a vertically integrated access unit, a user group, or to a user, but the system 200 determines that adding such logical work role would result in a flagged combination of entity capabilities, then the system 200 may block such logical work role from being added. By way of further example, if an administrator of the system 200 requests to link a user group to a vertically integrated access unit, but the system 200 determines that linking the user group to the vertically integrated access unit would result in a flagged combination of entity capabilities, then the system 200 may block such vertically integrated access unit from being linked to the user group. As another example, if an administrator of the system 200 requests to add a user to a user group, but the system 200 determines that adding such user to the user group would result in a flagged combination of entity capabilities, then the system 200 may block such user from being added to the user group.

In other embodiments, instead of automatically rejecting the proposed configuration, such action may include (i) identifying a proposed change that would alleviate an identified flagged combination of entity capabilities, (ii) presenting the proposed changed (e.g., via a graphical user interface) to a user (e.g., administrator) of the system 200, and, if such user accepts the proposed change, implement the proposed configuration and proposed change. The proposed change is typically a change to a vertically integrated access unit, user group, or user that, if implemented, would eliminate a flagged combination of entity capabilities that would otherwise occur if the proposed configuration were implemented. By way of example, if an administrator requests adding a user to a user group, but doing so would cause a flagged combination of entity capabilities, the system 200 may then (i) determine that removing the user from a different user group would eliminate the flagged combination of entity capabilities, (ii) propose to the administrator removing the user from the different user group, and (iii) if the administrator accepts such proposal, add the user to the user group and remove the user from the different user group.

In order to perform an action to prevent the first flagged combination of entity capabilities, the system 200 may communicate with resource access managers 155 of the information system 150 and cause such resource access managers 155 to perform one or more steps related to such action. For example, if the system 200 identifies a proposed change that would alleviate a flagged combination of entity capabilities that would otherwise result from a proposed configuration, and an administrator of the system 200 accepts the proposed change, then the system may cause the resource access managers to implement the proposed change and the proposed configuration.

The foregoing method 500 for creating user entitlements may be repeated to provision additional user entitlements (either to the same user or to different users).

In some embodiments, the system 200 may be configured to perform one or more of the steps described herein (e.g., those steps described with respect to methods 300, 400, 500, and 600) in real-time or near real-time, thereby facilitating prompt identification and remediation or prevention of flagged combinations of entity capabilities. In other words, these steps may occur without any significant delay between such steps (e.g., within a few seconds or minutes).

As evident from the preceding description, the system described herein represents an improvement in technology in that the system is able to identify flagged combinations of entity capabilities and then take an action to address such flagged combinations of entity capabilities. In contrast with existing resource access manages which do not provide information regarding entity capabilities that are enabled by entitlements, permissions, or access control rules, the system maintains a database that links together related entity capabilities, interfaces, access control rules, and computing resources. By linking together in such database the data records of related entity capabilities, interfaces, access control rules, and computing resources, the system can identify entity capabilities enabled by entitlements, permissions, and access control rules. These entity capabilities can then be compared against known flagged combinations of entity capabilities, thereby allowing the system to identify flagged combinations of entity capabilities that may result from particular entitlements, permissions, and access control rules. Where a flagged combination of entity capabilities is enabled by an existing entitlement, the system may automatically perform an information security action to remediate such flagged combination of entity capabilities. The system may also leverage the database to form vertically integrated access units that may be used as the basis for forming entitlements narrowly tailored to particular logical work roles. The system may continuously monitor whether any proposed configurations (e.g., configurations of logical work roles, vertically integrated access units, users, or user groups) would create a flagged combination of entity capabilities, and, if so, take an action to prevent such flagged combination of entity capabilities from being created. Accordingly, the system provides a technical solution for overcoming problems associated with identifying and remediating (or preventing) flagged combinations of entity capabilities.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computerized vertically integrated access control system for identifying and remediating flagged combinations of capabilities resulting from user entitlements to computing resources, comprising:
   a computer processor; a memory;
      a network communication device; and
      an access control module stored in the memory, executable by the computer processor, and configured to perform the steps of:
      collecting information regarding a plurality of entity capabilities of an entity; storing, in a database, a plurality of entity capability data records, each entity capability data record corresponding to an entity capability of the plurality of entity capabilities;
      collecting information regarding a plurality of flagged combinations of entity capabilities;
      storing, in the database, a plurality of flagged combination data records, each flagged combination data record corresponding to a flagged combination of entity capabilities;
      collecting information regarding interfaces of an information system of the entity; collecting information regarding access control rules of the information system; collecting information regarding computing resources of the information system; storing, in the database, a plurality of data records corresponding to the interfaces, access control rules, and computing resources of the information system;
      for each entity capability, linking in the database said entity capability to each interface that implements said entity capability;
      for each interface, linking in the database said interface to each access control rule for accessing said interface;
      for each computing resource, linking in the database said computing resource to each access control rule for accessing said computing resource;
      for each interface, linking in the database said interface to each computing resource accessed by said interface;
      identifying entitlements of a first user within the information system; based on the entitlements of the first user, identifying access control rules assigned to the first user;
      identifying entity capabilities of the first user by identifying entity capabilities linked in the database to the access control rules assigned to the first user;
      comparing the entity capabilities of the first user to the plurality of flagged combinations of entity capabilities;
      in response to comparing the entity capabilities of the first user to the plurality of flagged combinations of entity capabilities, determining that the entity capabilities of the first user comprise a first flagged combination of entity capabilities;
      in response to determining that the entity capabilities of the first user comprise the first flagged combination of entity capabilities, performing an information security action to remediate the first flagged combination of entity capabilities.

2. The computerized system according to claim 1, wherein the access control module is configured to perform the steps of:
   collecting information regarding users of the information system, the users of the information system comprising the first user;
   collecting information regarding entitlements of the information system, the entitlements of the information system comprising the entitlements of the first user;
   storing, in the database, a plurality of data records corresponding to the users and entitlements of the information system;

for each entitlement, linking in the database said entitlement to each user to which said entitlement has been provisioned; and for each entitlement, linking in the database said entitlement to each access control rule associated with said entitlement.

3. The computerized system according to claim 2, wherein the access control module is configured to perform the steps of:

collecting information regarding permissions of the information system, each permission comprising a subset of the access control rules of the information system;

collecting information regarding user groups of the information system;

storing, in the database, a plurality of data records corresponding to the permissions and user groups of the information system;

for each user group, linking in the database said user group to each user assigned to said user group;

for each user group, linking in the database said user group to each permission assigned to said user group; and for each permission, linking in the database said permission to access control rule comprised in said permission.

4. The computerized system according to claim 1, wherein the step of identifying the access control rules assigned to the first user comprises identifying one or more permissions assigned to the first user.

5. The computerized system according to claim 1, wherein:

the computing resources of the information system comprise application component methods;

the step of storing, in the database, the plurality of data records corresponding to the interfaces, access control rules, and computing resources of the information system, comprises storing, in the database, a plurality of data records corresponding to the application component methods of the information system;

the step of, for each computing resource, linking in the database said computing resource to each access control rule for accessing said computing resource, comprises, for each application component method, linking in the database said application component method to each access control rule for accessing said application component method; and the step of, for each interface, linking in the database said interface to each computing resource accessed by said interface, comprises, for each interface, linking in the database said interface to each application component method accessed by said interface.

6. The computerized system according to claim 1, wherein the information security action comprises removing from the first user one or more of the entitlements of the first user.

7. The computerized system according to claim 1, wherein the information security action comprises suspending one or more of the entitlements of the first user.

8. The computerized system according to claim 1, wherein the information security action comprises modifying one or more of the entitlements of the first user so that the entity capabilities of the first user no longer comprise the first flagged combination of entity capabilities.

9. A computer program product for identifying and remediating flagged combinations of capabilities resulting from user entitlements to computing resources, the computer program product comprising a non-transitory computer-readable storage medium having computer-executable instructions for causing a computer processor to perform the steps of:

collecting information regarding a plurality of entity capabilities of an entity; storing, in a database, a plurality of entity capability data records, each entity capability data record corresponding to an entity capability of the plurality of entity capabilities;

collecting information regarding a plurality of flagged combinations of entity capabilities; storing, in the database, a plurality of flagged combination data records, each flagged combination data record corresponding to a flagged combination of entity capabilities;

collecting information regarding interfaces of an information system of the entity; collecting information regarding access control rules of the information system; collecting information regarding computing resources of the information system; storing, in the database, a plurality of data records corresponding to the interfaces, access control rules, and computing resources of the information system;

for each entity capability, linking in the database said entity capability to each interface that implements said entity capability;

for each interface, linking in the database said interface to each access control rule for accessing said interface;

for each computing resource, linking in the database said computing resource to each access control rule for accessing said computing resource;

for each interface, linking in the database said interface to each computing resource accessed by said interface;

identifying entitlements of a first user within the information system: based on the entitlements of the first user, identifying access control rules assigned to the first user;

identifying entity capabilities of the first user by identifying entity capabilities linked in the database to the access control rules assigned to the first user;

comparing the entity capabilities of the first user to the plurality of flagged combinations of entity capabilities;

in response to comparing the entity capabilities of the first user to the plurality of flagged combinations of entity capabilities, determining that the entity capabilities of the first user comprise a first flagged combination of entity capabilities;

in response to determining that the entity capabilities of the first user comprise the first flagged combination of entity capabilities, performing an information security action to remediate the first flagged combination of entity capabilities.

10. The computer program product according to claim 9, wherein the non-transitory computer-readable storage medium has computer-executable instructions for causing the computer processor to perform the steps:

collecting information regarding users of the information system, the users of the information system comprising the first user;

collecting information regarding entitlements of the information system, the entitlements of the information system comprising the entitlements of the first user;

storing, in the database, a plurality of data records corresponding to the users and entitlements of the information system;

for each entitlement, linking in the database said entitlement to each user to which said entitlement has been provisioned; and for each entitlement, linking in the database said entitlement to each access control rule associated with said entitlement.

11. The computer program product according to claim 10, wherein the non-transitory computer-readable storage medium has computer-executable instructions for causing the computer processor to perform the steps:
collecting information regarding permissions of the information system, each permission comprising a subset of the access control rules of the information system;
collecting information regarding user groups of the information system;
storing, in the database, a plurality of data records corresponding to the permissions and user groups of the information system;
for each user group, linking in the database said user group to each user assigned to said user group;
for each user group, linking in the database said user group to each permission assigned to said user group; and
for each permission, linking in the database said permission to access control rule comprised in said permission.

12. The computer program product according to claim 9, wherein the step of identifying the access control rules assigned to the first user comprises identifying one or more permissions assigned to the first user.

13. The computer program product according to claim 9, wherein:
the computing resources of the information system comprise application component methods;
the step of storing, in the database, the plurality of data records corresponding to the interfaces, access control rules, and computing resources of the information system, comprises storing, in the database, a plurality of data records corresponding to the application component methods of the information system;
the step of, for each computing resource, linking in the database said computing resource to each access control rule for accessing said computing resource, comprises, for each application component method, linking in the database said application component method to each access control rule for accessing said application component method; and
the step of, for each interface, linking in the database said interface to each computing resource accessed by said interface, comprises, for each interface, linking in the database said interface to each application component method accessed by said interface.

14. The computer program product according to claim 9, wherein the information security action comprises removing from the first user one or more of the entitlements of the first user.

15. The computer program product according to claim 9, wherein the information security action comprises suspending one or more of the entitlements of the first user.

16. The computer program product according to claim 9, wherein the information security action comprises modifying one or more of the entitlements of the first user so that the entity capabilities of the first user no longer comprise the first flagged combination of entity capabilities.

17. A computerized method for identifying and remediating flagged combinations of capabilities resulting from user entitlements to computing resources, the method comprising the steps of:
collecting, via a computer processor, information regarding a plurality of entity capabilities of an entity;
storing, via a computer processor, in a database, a plurality of entity capability data records, each entity capability data record corresponding to an entity capability of the plurality of entity capabilities;
collecting, via a computer processor, information regarding a plurality of flagged combinations of entity capabilities;
storing, via a computer processor, in the database, a plurality of flagged combination data records, each flagged combination data record corresponding to a flagged combination of entity capabilities;
collecting, via a computer processor, information regarding interfaces of an information system of the entity;
collecting, via a computer processor, information regarding access control rules of the information system;
collecting, via a computer processor, information regarding computing resources of the information system;
storing, via a computer processor, in the database, a plurality of data records corresponding to the interfaces, access control rules, and computing resources of the information system;
for each entity capability, linking, via a computer processor, in the database said entity capability to each interface that implements said entity capability;
for each interface, linking, via a computer processor, in the database said interface to each access control rule for accessing said interface;
for each computing resource, linking, via a computer processor, in the database said computing resource to each access control rule for accessing said computing resource;
for each interface, linking, via a computer processor, in the database said interface to each computing resource accessed by said interface;
identifying, via a computer processor, entitlements of a first user within the information system;
based on the entitlements of the first user, identifying, via a computer processor, access control rules assigned to the first user;
identifying, via a computer processor, entity capabilities of the first user by identifying entity capabilities linked in the database to the access control rules assigned to the first user;
comparing, via a computer processor, the entity capabilities of the first user to the plurality of flagged combinations of entity capabilities;
in response to comparing the entity capabilities of the first user to the plurality of flagged combinations of entity capabilities, determining, via a computer processor, that the entity capabilities of the first user comprise a first flagged combination of entity capabilities;
in response to determining that the entity capabilities of the first user comprise the first flagged combination of entity capabilities, performing, via a computer processor, an information security action to remediate the first flagged combination of entity capabilities.

18. The computerized method according to claim 17, comprising:
collecting information regarding users of the information system, the users of the information system comprising the first user;
collecting information regarding entitlements of the information system, the entitlements of the information system comprising the entitlements of the first user;
storing, in the database, a plurality of data records corresponding to the users and entitlements of the information system;

for each entitlement, linking in the database said entitlement to each user to which said entitlement has been provisioned; and for each entitlement, linking in the database said entitlement to each access control rule associated with said entitlement.

19. The computerized method according to claim 18, comprising:

collecting information regarding permissions of the information system, each permission comprising a subset of the access control rules of the information system;

collecting information regarding user groups of the information system;

storing, in the database, a plurality of data records corresponding to the permissions and user groups of the information system;

for each user group, linking in the database said user group to each user assigned to said user group;

for each user group, linking in the database said user group to each permission assigned to said user group; and for each permission, linking in the database said permission to access control rule comprised in said permission.

20. The computerized method according to claim 17, wherein the information security action comprises (i) removing from the first user one or more of the entitlements of the first user, (ii) suspending one or more of the entitlements of the first user, or (iii) modifying one or more of the entitlements of the first user so that the entity capabilities of the first user no longer comprise the first flagged combination of entity capabilities.

* * * * *